US006947002B1

(12) United States Patent
Chen et al.

(10) Patent No.: US 6,947,002 B1
(45) Date of Patent: Sep. 20, 2005

(54) ANTENNA

(75) Inventors: Li-Sen Chen, Taoyuan Hsien (TW); Chieh-Lin Tseng, Taoyuan-Hsien (TW); Lun-Ting Liu, Taoyuan Hsien (TW); Yen-Jang Liao, Taoyuan Hsien (TW); Wen-Tsung Hsiao, Taoyuan Hsien (TW)

(73) Assignee: Speed Tech Corp., Taoyuan Hsien (TW)

( * ) Notice: Subject to any disclaimer, the term of this patent is extended or adjusted under 35 U.S.C. 154(b) by 0 days.

(21) Appl. No.: 10/973,245

(22) Filed: Oct. 27, 2004

(51) Int. Cl.[7] ................................................ H01Q 1/24
(52) U.S. Cl. ...................................... 343/702; 343/895
(58) Field of Search ................................ 343/702, 895, 343/900, 906; H01Q 1/24

(56) References Cited

U.S. PATENT DOCUMENTS

| | | | | |
|---|---|---|---|---|
| 3,523,251 | A * | 8/1970 | Halstead | 455/282 |
| 6,232,925 | B1 * | 5/2001 | Fujikawa | 343/702 |
| 6,259,411 | B1 * | 7/2001 | Yanagisawa et al. | 343/713 |

* cited by examiner

*Primary Examiner*—Hoanganh Le
(74) *Attorney, Agent, or Firm*—Birch, Stewart, Kolasch & Birch, LLP

(57) ABSTRACT

An antenna includes an electrically insulative narrow elongated bracket, a coiled resonant conductor sleeved onto the bracket, a coaxial cable signal line extended out of one end of the bracket, a first metal conducting connecting member fastened to the bracket and connected to one end of the coiled resonant conductor, and a second metal conducting connecting member fastened to outer insulative layer and a tubular braided conducting layer of the signal line to secure the signal line to the bracket and to let the center conductor of the signal line be electrically connected to the first metal conducting connecting member and the resonant conductor.

4 Claims, 4 Drawing Sheets

ANTENNA

BACKGROUND OF THE INVENTION

1. Field of the Invention

The present invention relates to an antenna and more particularly, to a small size antenna suitable for mounting inside a notebook computer for receiving broadcasting signal.

2. Description of the Related Art

Regular antennas for receiving broadcasting signal are generally of a monopole design for receiving frequency range approximately within 88~108 MHz. In order to have a good signal receiving power, the length of a monopole antenna is set at about one fourth of signal wavelength, i.e., about 75 cm. For broad application, most monopole antennas are made in a telescopic form. A 75 cm monopole antenna is not suitable for use in a notebook computer. If a monopole antenna is made telescopic for use in a notebook computer, the notebook computer must have a hole in the shell for enabling the monopole antenna to be moved in and out of the shell of the notebook computer. However, the presence of such a hole obstructs the sense of beauty of the shell of the notebook computer.

There is known an improved structure of monopole antenna, which uses an earphone signal line for tuning. The total length of this design of monopole antenna is about one fourth of signal wavelength. However, when an external speaker is used with the notebook computer for voice output, an earphone signal line must be installed as antenna means, thereby complicated the arrangement of the outer appearance of the notebook computer. Further, because this design of monopole antenna does not have a fixed shape, it tends to produce noises.

SUMMARY OF THE INVENTION

The present invention has been accomplished under the circumstances in view. It is therefore the main object of the present invention to provide an antenna, which has a small size suitable for mounting inside a notebook computer for receiving broadcasting signal.

To achieve this and other objects of the present invention, the antenna comprises an electrically insulative narrow elongated bracket, the electrically insulative narrow elongated bracket comprising at least one retaining flange and a locating groove surrounded by the at least one retaining flange; a resonant conductor, the resonant conductor having a coiled body sleeved onto the electrically insulative narrow elongated bracket; a connecting device fastened to the electrically insulative narrow elongated bracket, the connecting device comprising a first metal conductive connecting member connected to one end of the resonant conductor and fastened to the locating groove within the at least one retaining flange; and a signal line, the signal line having a center conductor electrically connected to the first metal conductive connecting member of the connecting device.

DETAILED DESCRIPTION OF THE PREFERRED EMBODIMENT

Figure 1:
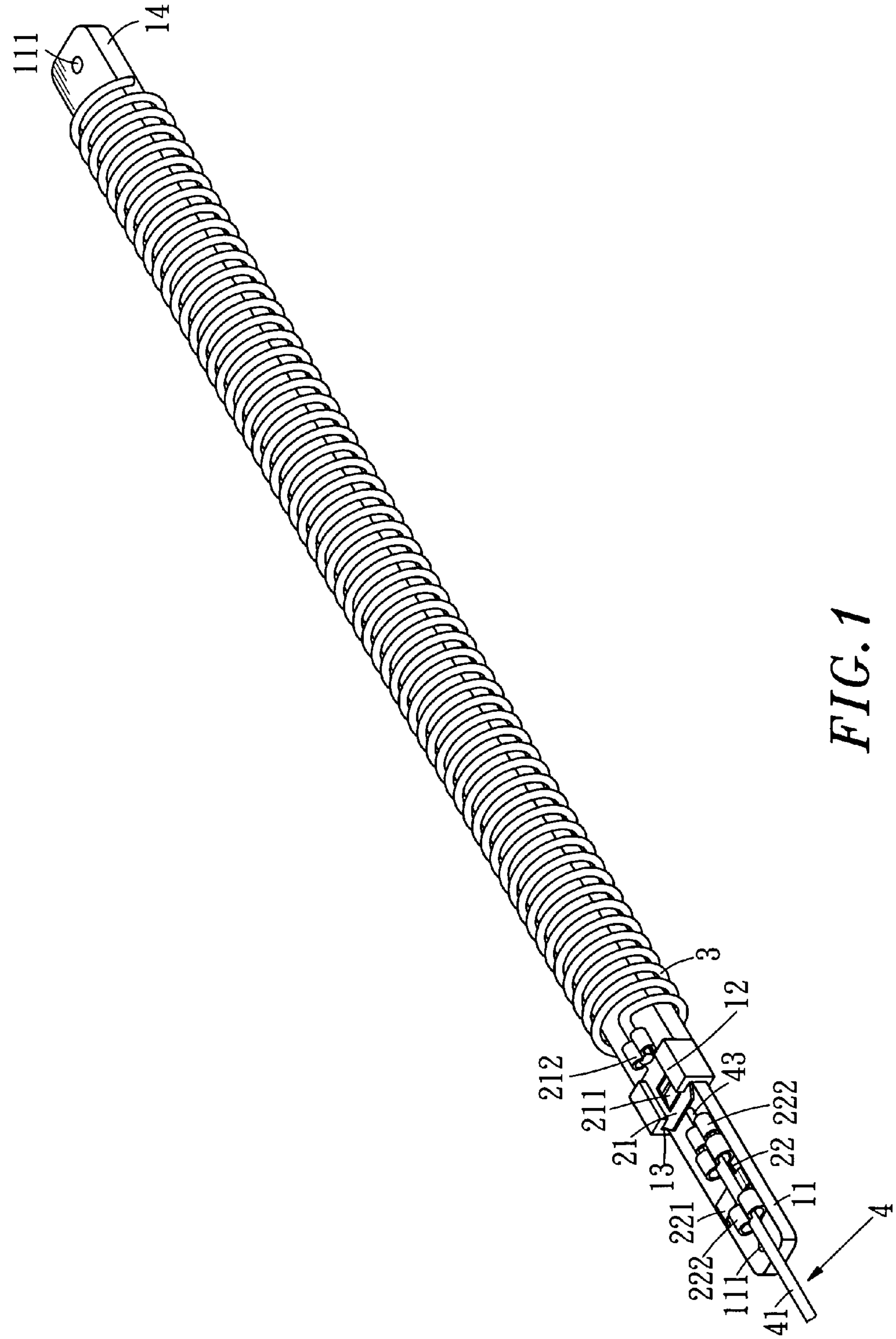
FIG. 1 is a perspective view of an antenna according to the present invention.
Figure 2:
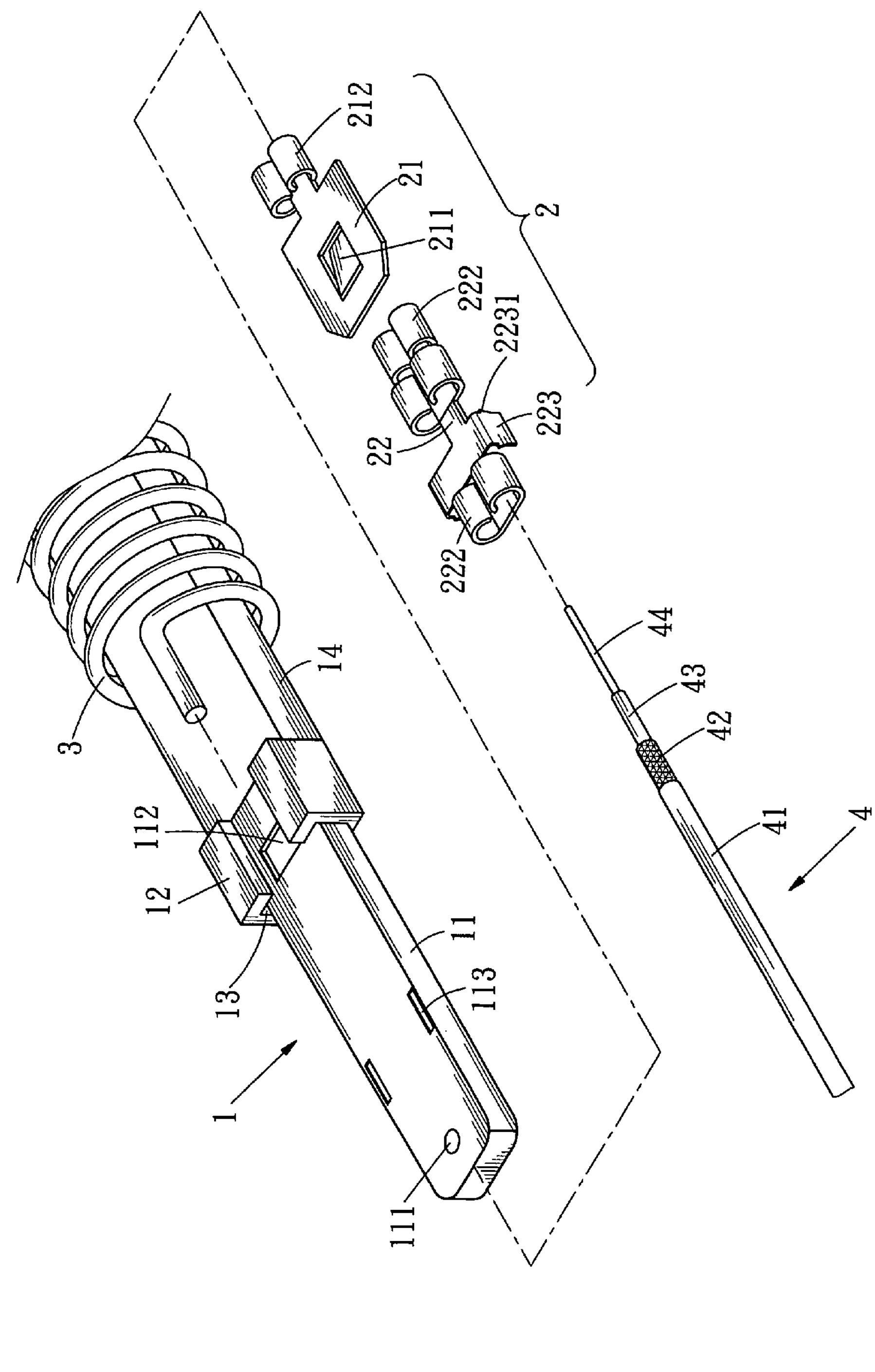
FIG. 2 is an exploded view of the antenna according to the present invention.
Figure 3:
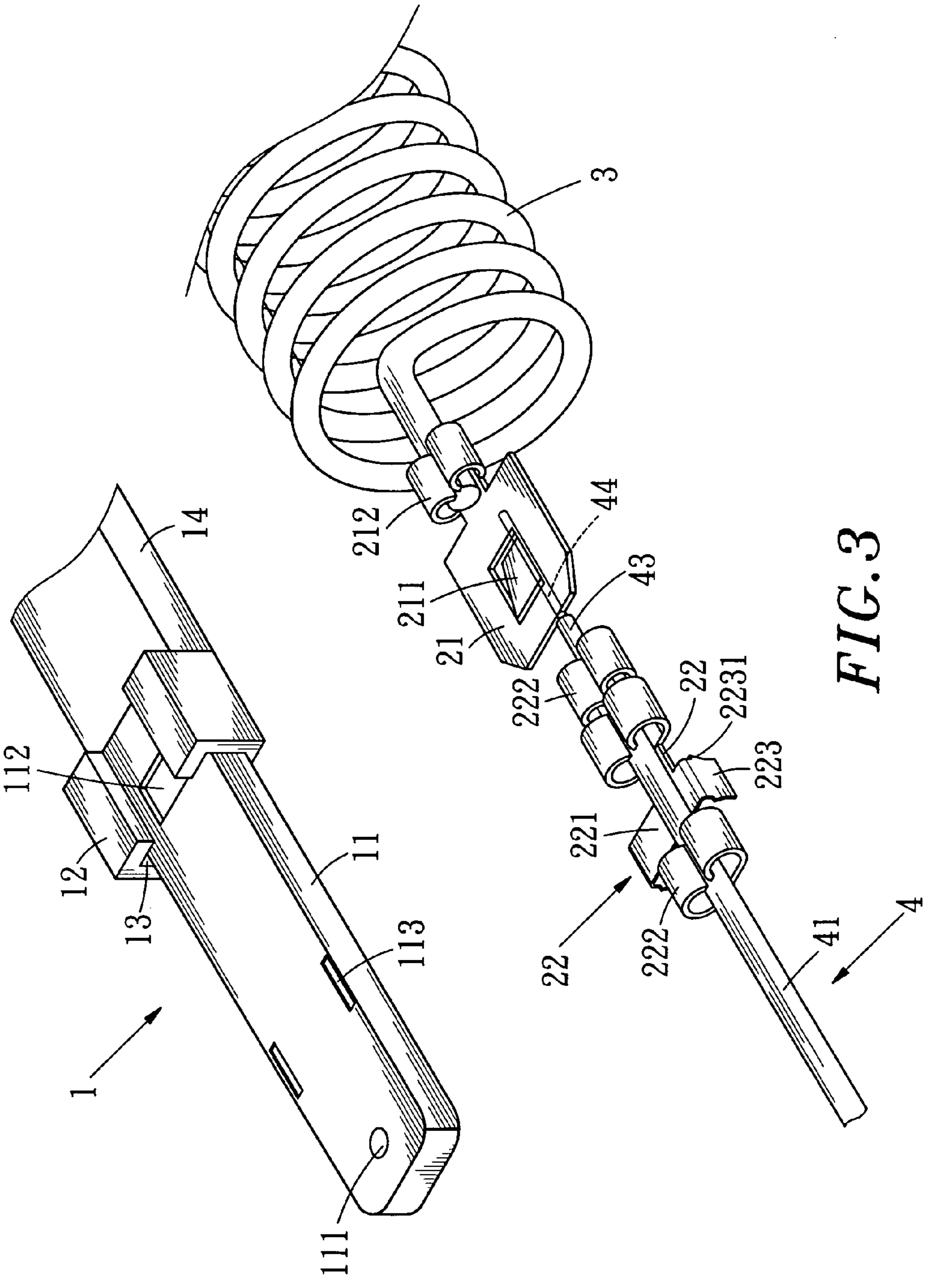
FIG. 3 is an exploded view of the present invention after assembly of a part of the antenna.

Referring to FIGS. 1~3, an antenna in accordance with the preferred embodiment of present invention is shown comprised of a bracket 1, a connecting device 2, a resonant conductor 3, and a signal line 4.

The bracket 1 is an electrically insulative member comprising a flat elongated base 14, a front extension 11 axially forwardly extended from one end of the flat elongated base 14, two retaining flanges 12 symmetrically extended from two opposite lateral sides of the bracket 1 thereof between the front extension 11 and the flat elongated base 14, a locating groove 13 defined between the retaining flanges 12 and the front extension 11, a recessed locating hole 112 formed in between the front extension 11 and the flat elongated base 14 within the locating groove 13, two mounting slots 113 bilaterally formed in the front extension 11 on the middle, and two mounting through holes 111 respectively formed in the distal end (the front end) of the front extension 11 and the distal end (the rear end) of the flat elongated base 14, in this embodiment. By means of the mounting through holes 111, the bracket 1 can easily be fastened to an electronic apparatus, for example, a notebook computer (not shown).

The resonant conductor 3 is a coiled conductor mounted on the flat elongated base 14 of the bracket 1 and connected to one end of the connecting device 2. The original length of the resonant conductor 3 is about one fourth of the signal wavelength.

The signal line 4 is formed of a coaxial cable comprising an outer insulative layer 41, a tubular braided conducting layer 42, an inner insulative layer 43, and a center conductor 44. The center conductor 44 is covered within the inner insulative layer 43. The tubular braided conducting layer 42 is covered on the periphery of the inner insulative layer 43 within the outer insulative layer 41. The center conductor 44 in this embodiment is electrically connected to the connecting device 2 by welding.

The connecting device 2 is made of metal conducting material, comprising a first connecting member 21 and a second connecting member 22. The first connecting member 21 is fastened to the locating groove 13 of the bracket 1 and held down by the retaining flanges 12, having a clamping portion 212 formed in one end thereof and fastened to one end of the resonant conductor 3 and a retaining spring strip 211 formed in the other end thereof and engaged into the recessed locating hole 112 to stop backward movement of the first connecting member 21 relative to the bracket 1. The second connecting member 22 comprises two clamping portions 222 respectively formed in the two distal ends thereof and respectively clamped on the outer insulative layer 41 and the tubular braided conducting layer 42 of the signal line 4, two grounding mounting plates 223 spaced between the clamping portions 222 and respectively inserted through the mounting slots 113 of the bracket 1 for connection to the grounding circuit of the electronic apparatus, for example, notebook computer (not shown), and two positioning portions 2231 respectively protruded from the grounding mounting plates 223 for friction engagement with the mounting slots 113.

The assembly process of the antenna is simple and outlined hereinafter with reference to FIGS. 1~3 again. The resonant conductor 3 is sleeved onto the flat elongated base 14 of the bracket 1, and then the clamping portion 212 of the first connecting member 21 is fastened to one end of the resonant conductor 3, and then the resonant conductor 3 is pushed forwards to insert the first connecting member 21 into the locating groove 13 and to further force the retaining spring strip 211 into the recessed locating hole 112, and then the signal line 4 is fastened to the clamping portions 222 of the second connecting member 22 to have the tubular braided conducting layer 42 connected to one clamping portion 222 electrically, and then the grounding mounting plates 223 of the second connecting member 22 are respectively inserted through the mounting slots 113 of the bracket 1 to force the positioning portions 2231 into friction engagement with the mounting slots 113 of the bracket 1 and to have the center conductor 44 be electrically connected to the first connecting member 21.

Figure 4:
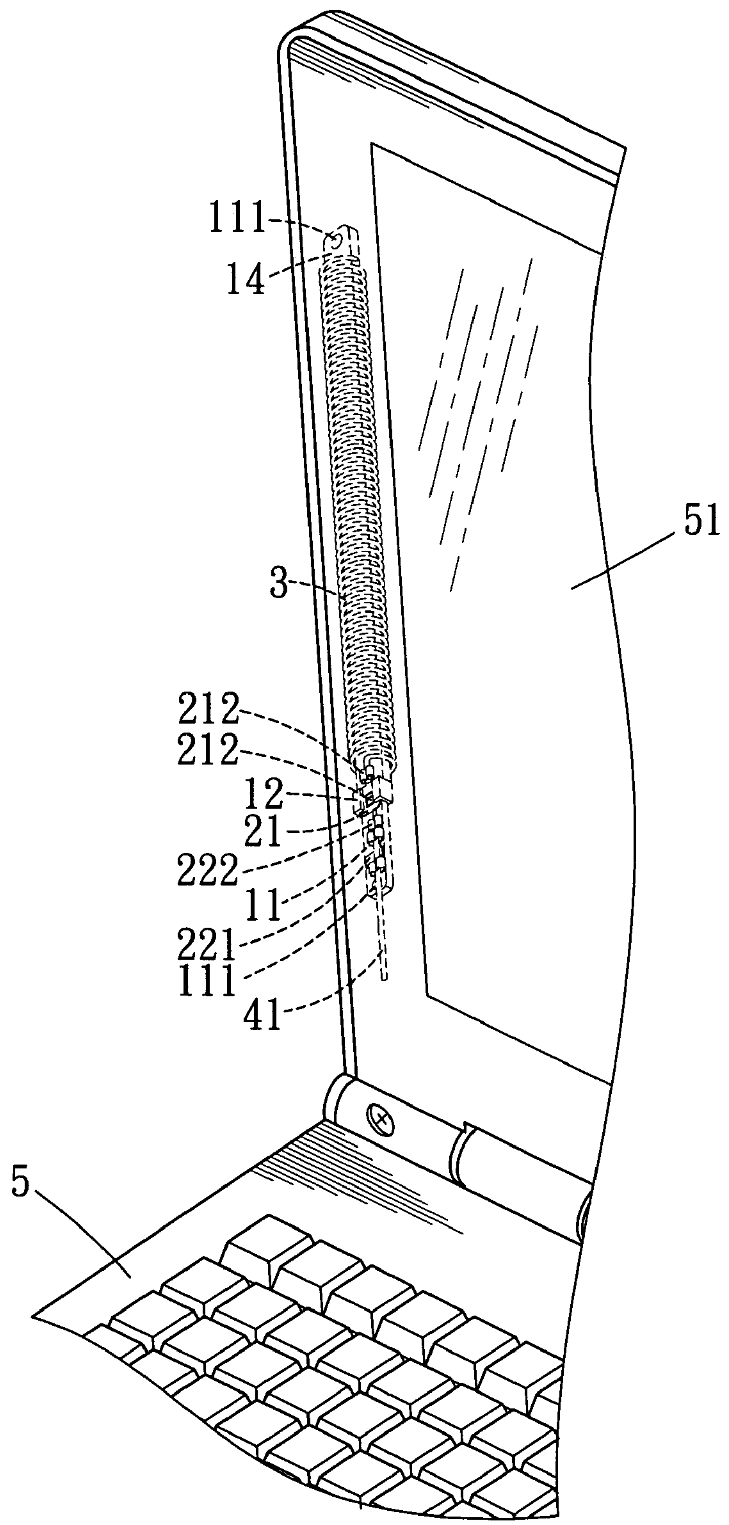
FIG. 4 is an applied view of the present invention, showing the antenna mounted inside the shell of a notebook computer.

FIG. 4 shows an application example of the present invention. As illustrate, the two mounting through holes 111 of the bracket 1 of the antenna are fixedly fastened to the shell 51 of the notebook computer 5, keeping the signal line 4 electrically connected to the circuit (not shown) of the notebook computer 5 so that the frequency modulation signal received from the resonant conductor 3 can be transmitted to the circuit of the notebook computer 5 through the signal line 4.

This first connecting member 21 of the connecting device 2 in this embodiment of present invention is welded with the center conductor 44 for electrical connection, and one skilled in this art would have other options without welding to do so, for example, using clippers, similar to the clamping portion 222 of the second connecting member 22 in aforesaid embodiment.

Moreover, the second connecting member 22 in aforesaid embodiment is for positioning the signal line 4 and communicating the grounding circuit from tubular braided conducting layer 42 to the grounding path on the circuit board in the notebook computer; therefore, omitting the second connecting member 22 in aforesaid embodiment or using some other optional device to substitute it would be obviousness for one skilled in this art.

Further, because signal electric field is normally maintained perpendicular to the electrical flow, the optimum receiving condition is to have the antenna in vertical position, i.e., the display module of the notebook computer 5 in which the antenna is installed is opened from base member of the notebook computer 5 and set in 90 angles.

Further, because the resonant conductor 3 is a coiled member installed in the notebook computer 5, it may vibrate with the notebook computer 5. Shock absorbing rubber or thermoplastic covering may be covered on the resonant conductor 3 to restrict the resonant conductor 3 to lessen the vibration.

As indicated above, the invention provides an antenna, which eliminates the drawbacks of the prior art design based on the technical features as follows.

1. The invention uses a coiled resonant conductor to minimize the size of the antenna so that the antenna can conveniently be mounted inside a notebook computer without obstructing the outer appearance of the notebook computer, for enabling the notebook computer to receive frequency modulation broadcasting signal.

2. The invention uses a bracket to support the resonant conductor in the shell of a notebook computer positively in place without producing noises due to vibration of the notebook computer, enabling the user to enjoy a high frequency modulation broadcasting signal receiving quality.

A prototype of antenna has been constructed with the features of FIGS. 1~4. The antenna functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An antenna comprising:

an electrically insulative narrow elongated bracket comprising at least one retaining flange and a locating groove surrounded by said at least one retaining flange;

a resonant conductor having a coiled body sleeved onto said bracket;

a connecting device fastened to said bracket, said connecting device comprising a first metal conductive connecting member connected to one end of said resonant conductor and fastened to said locating groove within said at least one retaining flange; and a signal line having a center conductor electrically connected to said first connecting member of said connecting device.

2. The antenna as claimed in claim 1, wherein said connecting device further comprises a second metal conductive connecting member fastened to said bracket, said second connecting member comprising a plurality of clamping portions clamped on said signal line.

3. The antenna as claimed in claim 2, wherein said bracket comprises two mounting slots; said second connecting member of said connecting device comprises two grounding mounting plates respectively fastened to the mounting slots of said bracket.

4. The antenna as claimed in claim 2, wherein said signal line is a coaxial cable comprising an inner insulative layer covering said center conductor, a tubular braided conducting layer covering said inner insulative layer, and an outer insulative layer covering said tubular braided conducting layer; said second connecting member has the clamping portions thereof respectively clamped on said outer insulative layer and said tubular braided conducting layer of said signal line.

* * * * *